(No Model.)
C. H. GOODRICH.
GAS BRACKET AND COCK.
No. 260,972.  Patented July 11, 1882.
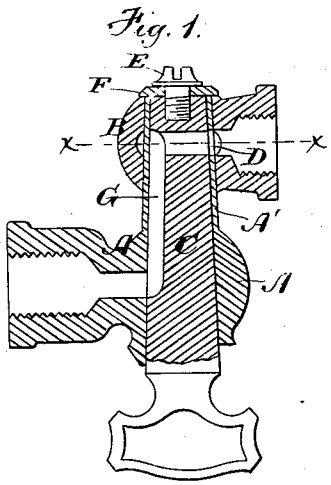
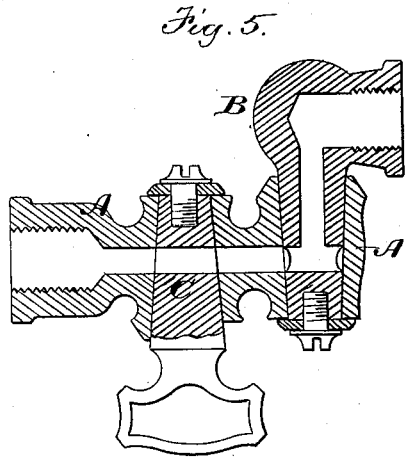
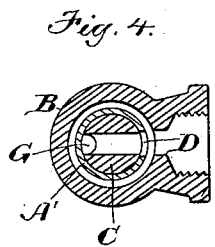
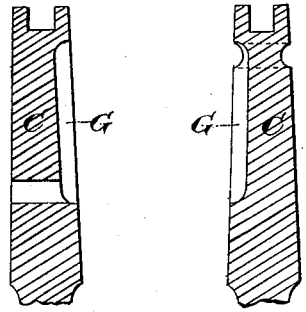
Witnesses:
R. L. Perkins
A. L. White
Inventor:
C. H. Goodrich
by Wright & Brown
Attys

UNITED STATES PATENT OFFICE.

CHARLES H. GOODRICH, OF BOSTON, MASSACHUSETTS.

GAS BRACKET AND COCK.

SPECIFICATION forming part of Letters Patent No. 260,972, dated July 11, 1882.

Application filed May 22, 1882. (No model.)

*To all whom it may concern:*

Be it known that I, CHARLES H. GOODRICH, of Boston, in the county of Suffolk and State of Massachusetts, have invented certain Improvements in Gas Brackets and Cocks, of which the following is a specification.

My invention relates to certain improvements in gas-cocks, fully described hereinafter, whereby the device is rendered more efficient and the liability of becoming inoperative through the clogging up of the gas-passages greatly reduced.

Of the accompanying drawings, forming a part of this specification, Figure 1 represents a vertical central section of a gas-bracket embodying my improvements. Figs. 2 and 3 represent modifications in the arrangement of gas-passages in the cock. Fig. 4 represents a section on line $x\ x$, Fig. 1. Fig. 5 represents a sectional view of the construction heretofore employed in brackets of this class.

The same letters of reference indicate the same parts in all the figures.

In the drawings, A represents the fixed part of the gas-bracket, adapted to be screwed to a fixed gas-pipe, and B represents the swinging part, pivoted to the part A, and is adapted to turn or swing horizontally.

C represents the cock, which is journaled in a socket in the fixed part.

Heretofore brackets of this class have been constructed substantially as shown in Fig. 5, the part A being extended outwardly beyond the cock-socket and provided with a second socket, which receives a plug or trunnion on the part B.

Instead of extending the part A outwardly from the cock-socket, I provide the part A with a vertical tubular extension, A', the interior of which forms an extension of the cock-socket, while the exterior forms a bearing on which the part B is journaled, the latter being provided with a cavity or socket fitting snugly on the extension A', and adapted to turn freely thereon. The extension A' is provided with an orifice, D, registering with the gas-channel of the part B, and to prevent the gas from being shut off by the swinging movement of the part B the gas-passage thereof should extend around the extension A', as shown in Figs. 1 and 4.

The cock C is elongated to fill the extension A', and is secured by a screw, E, and washer F, said screw and washer also securing the part B to the fixed part A.

It will be observed by comparison of Figs. 1 and 5 that by my improved construction the bracket is made more compact in form, a considerable saving of metal is effected in the construction of the parts A B, the amount of drilling required to form the gas-channels in said parts is considerably reduced, and one screw and washer are enabled to connect all the parts, instead of two, as heretofore.

The cock C is provided with an open longitudinal groove, G, in its surface, communicating with the gas-passage of the part A at one end, and with the orifice D of the extension A' at the other end. Said groove may communicate directly with the gas-passage of the part A at its lower end, as shown in Figs. 1 and 3, and with the orifice D by a transverse internal passage, as shown in Fig. 1, or by an external groove, as shown in Fig. 3; or said groove may communicate with the gas-passage of the part A by a transverse passage or groove and connect directly with the orifice D, as shown in Fig. 2. The provision of the open groove G in the cock renders the latter free from liability to become clogged or obstructed, enables it to be easily cleaned, and reduces the cost of manufacturing the plug, the groove being cast or molded in the cock, if desired.

I am aware that cocks have been grooved on their faces; but in such cases the grooves have been arranged circumferentially around the same, and are adapted to receive and carry off to the air gases that have accumulated around the seat through leakage; but my invention will be distinguished from the foregoing construction in that the face of the cock is grooved longitudinally, so as to communicate with the transverse passage in the same, rendering the device less liable to become clogged up through the accumulation of coal-tar or other substance in the gas, as in cases where the passage is arranged centrally within the cock, and at the same time producing a cock that can be removed and cleaned with facility.

I claim—

The combination, in a gas-bracket having the fixed part A and extension A', of the part B and removable pivot-cock C, grooved longitudinally in its face, and having a transverse passage communicating with said groove, as and for the purpose set forth.

In testimony whereof I have signed my name to this specification, in the presence of two subscribing witnesses, this 20th day of May, 1882.

CHARLES H. GOODRICH.

Witnesses:
P. W. FRENCH,
C. F. BROWN.